(12) United States Patent
Boettcher et al.

(10) Patent No.: US 7,885,791 B2
(45) Date of Patent: Feb. 8, 2011

(54) METHOD FOR CAPTURING LOCAL AND EVOLVING CLUSTERS

(75) Inventors: Mirko Boettcher, Ipswich (GB); Frank Hoeppner, Braunschweig (DE)

(73) Assignee: British Telecommunications public limited company, London (GB)

(*) Notice: Subject to any disclaimer, the term of this patent is extended or adjusted under 35 U.S.C. 154(b) by 141 days.

(21) Appl. No.: 11/708,674

(22) Filed: Feb. 21, 2007

(65) Prior Publication Data

US 2008/0201102 A1 Aug. 21, 2008

(51) Int. Cl.
*G06F 19/00* (2006.01)
*G06F 17/40* (2006.01)

(52) U.S. Cl. ........................... 702/189; 702/33

(58) Field of Classification Search ............. 702/1, 702/33, 34, 127, 179, 182, 186, 187, 189, 702/190; 707/100, 101, 102, 104.1, 705, 707/722, 899; 438/14; 700/90, 95, 108, 700/109, 110, 117, 121
See application file for complete search history.

(56) References Cited

U.S. PATENT DOCUMENTS

| | | | | |
|---|---|---|---|---|
| 2,883,255 | A * | 4/1959 | Anderson | 346/34 |
| 6,026,397 | A * | 2/2000 | Sheppard | 1/1 |
| 6,446,021 | B1 * | 9/2002 | Schaeffer | 702/118 |
| 6,797,526 | B2 * | 9/2004 | Tanaka et al. | 438/5 |
| 6,841,403 | B2 * | 1/2005 | Tanaka et al. | 438/14 |
| 6,944,607 | B1 * | 9/2005 | Zhang et al. | 707/737 |
| 6,965,831 | B2 * | 11/2005 | Domany et al. | 702/19 |
| 7,043,500 | B2 * | 5/2006 | Leary | 707/104.1 |
| 7,167,811 | B2 * | 1/2007 | Tabor | 702/183 |
| 7,437,271 | B2 * | 10/2008 | Tabor | 702/183 |
| 7,599,933 | B2 * | 10/2009 | Domany et al. | 1/1 |
| 2003/0009470 | A1 * | 1/2003 | Leary | 707/100 |
| 2003/0054573 | A1 * | 3/2003 | Tanaka et al. | 438/4 |
| 2003/0059818 | A1 * | 3/2003 | Domany et al. | 435/6 |
| 2003/0138978 | A1 * | 7/2003 | Tanaka et al. | 438/5 |
| 2003/0144810 | A1 * | 7/2003 | Tabor | 702/108 |
| 2005/0240563 | A1 * | 10/2005 | Domany et al. | 707/1 |
| 2007/0022065 | A1 * | 1/2007 | Hatano et al. | 706/16 |
| 2007/0179743 | A1 * | 8/2007 | Tabor | 702/182 |
| 2008/0243817 | A1 * | 10/2008 | Chan et al. | 707/5 |

OTHER PUBLICATIONS

Zhang et al., "BIRCH: An Efficient Data Clustering Method for Very large", SIGMOD '96 Jun. 1996 Montreal, Canada.

Kalnis et al., "On Discovering Moving Clusters in Spatio-Temporal", Proc. $9^{TH}$ Int. Conf. Scientific and Statistical Database Management, vol. 3633 of LINCS, pp. 236-253, 2005.

(Continued)

*Primary Examiner*—Edward R Cosimano
(74) *Attorney, Agent, or Firm*—Nixon & Vanderhye P.C.

(57) ABSTRACT

The present invention provides a method of detecting the growth and development of clusters in a data set. The data set is divided into a number of slices and an algorithm is applied to the data held in each data slice set. Each slice can be compared with the subsequent slice to determine which clusters persist from slice to slice. Random data agglomerations in a single slice may give the appearance of a cluster but their random nature means that they are unlikely to persist so those clusters that persist across a number of slices, or that show the strongest measure of persistence, are most likely to represent a data cluster that represents a situation of interest.

8 Claims, 16 Drawing Sheets

OTHER PUBLICATIONS

Topchy et al., "Adaptive Clustering Ensembles", circa 2004.
Kriegel et al., ":Incremental OPTICS: Efficient Computation of Updates in a Hierarchical Cluster Ordering", circa 1998.
Ghosh et al., "A Consensus Framework for Integrating Distributed Clusterings Under Limited Knowledge Sharing", circa 2000.
Guha et al., "Clustering Data Streams", pp. 1-8, circa 1998.
Li et al., "Clustering Moving Objects", Proc. $10^{TH}$ ACM SIGKDD Int. Conf on Knowl. Discovery and Data Mining, pp. 617-622, 2004.
Ankerst et al., "OPTICS:Ordering Points to Identify the Clustering Structure", Proc. ACM SIGMOD '99 Int. Conf. on Management of Data, Philadelphia, PA, 1999, pp. 49-60.
Siliopoulou et al., "MONIC—Modelling and Monitoring Cluster Transitions", Research Track Poster, KDD '06, Aug. 20-23, 2006, Philadelphia, PA, USA.
Aggarwal, et al., "A Framework for Clustering Evolving Data Streams", Proc. $29^{TH}$ Int. Conf. On Very Large Databases, pp. 81-82, 2003.
Brecheisen, S., et al. "Visually Mining Through Cluster Hierarchies"; Institute for Computer Science, University of Munich; circa 2003.
Munkres, J., "Algorithms for the Assignment and Transportation Problems"; J. Soc. Indust. Appl. Math., vol. 5, No. 1, Mar. 1957.

* cited by examiner

METHOD FOR CAPTURING LOCAL AND EVOLVING CLUSTERS

FIELD OF TECHNOLOGY

The present method relates to a method of detecting patterns in data and in particular to the detection of formation and evolution of clusters of data points.

BACKGROUND

Clustering is the partitioning of data into groups such that similar data objects belong to the same group and dissimilar objects to different groups according to some measure of similarity. The detection of clusters of data points is of significant interest when analysing large data sets. In some data sets, particularly those derived from business applications, the data set to be analysed is not fixed once and forever, but as time goes by additional data is added to the data set. This change in the data set may mean that the cluster model should be revised. Furthermore, by considering the temporal dimension it may be possible to carry out a more rigorous analysis. For example, consider two clusters that are moving along intersecting paths within a two-dimensional plane. If the temporal analysis is discarded then the intersecting clusters may appear to be a single connected cluster, rather than two unconnected clusters that happen to intersect at a given point in time.

A system that can detect the formation and/or variation in clusters can be used to build systems for the early detection of patterns of abnormal usage of communications networks, amongst other things. Such abnormal network usage includes, but is not limited to:

Illegal or malicious activities: These are activities intentionally carried out without the permission of the network owner in order to gain access to network resources or to damage the network and connected devices.

Novel network user activities: These are activities which are carried out by a user and permitted by the network owner but show novel characteristics when compared to the usage history or when compared to the network usage specification.

Activities due to faulty equipment: These are network activities caused by faulty or otherwise malfunctioning network equipment.

The state of a network can be analysed by network statistics recorded by sensors from the network. Such statistics can be, for example, bandwidth utilization, packet drop rate, number of users connected to a wireless hub, or the average traffic caused by premium users, etc. Each of the above activities causes certain patterns in the statistics taken from a computer network. This means, for the same activity a subset of the statistics are very likely to have similar values. They therefore form clusters which can be detected by cluster algorithms. However, the above mentioned activities are quite rare and so are the clusters. Furthermore, it is very difficult to distinguish whether a certain cluster just happens by chance, for example due to a random peak in network utilization, or systematically, for example, because a new exploit has been developed that gives unrestricted access to a wireless hot spot without paying. On the other hand, it is very important to detect any of the above activities in its earliest stages to take suitable countermeasures. Early stages, in this context, means detecting very small clusters in a rather noisy environment. This, however, is not possible with existing clustering approaches.

Furthermore, there has recently been increased interest in so-called local patterns rather than the global structure of the data, as the global data structure is much better known by domain experts and therefore not considered as interesting and small data structures may indicate niches or upcoming trends which may be of significant interest or value.

The difficulty with analysing local patterns is, however, that quite often large numbers of patterns are 'discovered' by some data mining technique (e.g. association rules) but most of them prove to be uninteresting or incidental on closer inspection. In practise this means that quite often a lot of time is wasted on scanning these useless patterns and the whole data mining effort is put into question.

There are two different approaches to the notions of 'moving cluster'. The real world objects that make up the cluster may change as a whole and if we observe the objects at some later point in time we will find a different cluster position. This approach requires some kind of object ID to match different data objects to the same real world object in order to capture the change (Li et al, "*Clustering moving objects*", Proc. 10th ACM SIGKDD Int. Conf. on Knowl. Discovery and Data Mining, pages 617-622, 2004 and Kalnis et al, "*On discovering moving clusters in spatio-temporal data*", Proc. 9th Int. Conf. Scientific and Statistical Database Management, vol. 3633 of LNCS, pages 236-253, 2005).

The second notion of a 'moving cluster' is that the cluster itself changes but not necessarily the individual real world objects represented by the cluster (CC Aggarwal et al, "*A framework for clustering evolving data streams*", Proc. 29th Int. Conf. on Very Large Databases, pages 81-92, 2003). As an example, the cluster of 'young people with frequent phoning behaviour' may change over time; that is, new customers may expose a different phoning behaviour than existing customers, changing slowly the characteristics of the cluster. This is the kind of 'moving clusters' that are addressed in the present invention.

SUMMARY

According to a first aspect of the present invention there is provided a method of evaluating one or more clusters in a data set, the method comprising the steps of:

a) dividing said data set into a plurality of data slices; b) selecting a plurality of data slice groups from said plurality of data slices; c) applying a data clustering algorithm to each of said data slice groups; and d) for each of said data slice groups, comparing the results of the data clustering algorithm with the results obtained from the a subsequent data slice group to determine one or more persistent data clusters.

In step d) a data cluster may be defined as a persistent data cluster if it is present in a plurality of subsequent data slice groups. Furthermore, in step d) a data cluster may be defined as a persistent data cluster if it is present in at least 3 subsequent data slice groups.

Alternatively, in step d) a data cluster may be defined as a persistent data cluster if it a cluster persistence parameter exceeds a given threshold.

The present invention allows small and moving patterns in very noisy data to be detected. The present invention allows the development of clusters to be tracked over time and, more importantly, to distinguish tiny local structures from incidental data agglomerations. If data agglomerates by chance, it is very unlikely that this coincidence will happen over and over again. It is shown below that the present invention is capable of identifying very small local patterns, even in cases where there is much more noise than substantial data points, with only a very small number of false positives being flagged.

BRIEF DESCRIPTION OF DRAWINGS

The invention will now be described with reference to the following Figures, which are provided by way of example only, in which.

DETAILED DESCRIPTION

Before the variation in any clusters can be determined, it is necessary to detect the presence of one or more clusters and the parameters that are associates with the cluster. It is understood that the present invention is suitable for use with any clustering algorithm, but it is preferred that the clustering algorithm used has the following properties:

Flexibility: the notion of a cluster supported by the clustering algorithm must be flexible in order to cope with cluster changes, for example the merging of two clusters. The k-Means algorithm and its many derivatives, for instance, assume roughly equal-sized hyperspheres as clusters, but if two clusters merge (partially overlap) the resulting shape is no longer a hypersphere. All clustering algorithms that assume a certain model for a cluster may have some difficulties here (e.g. k-Means, mixture of Gaussians).

Robustness: at the time of setting up the algorithm, it is not possible to know what clusters will develop in the future. Thus the parameters can not be tailored to a 'representative dataset', but the algorithm must work with a wide range of noise and cluster densities.

Stability: the algorithm should be as stable as possible, that is a similar input should lead to similar output. This is important in order to be able to trace and compare clusters obtained from different runs of the algorithm. If a major change is observed in the clusters then the change must be caused by the data, rather than the algorithm. Lack of stability might be caused by iterative optimisation, where a different initialisation may already lead to a different partition (k-means and derivatives, mixture of Gaussians, split-and-combine approaches), or by the choice of the distance measure (in hierarchical clustering with single-linkage a single new data object may have dramatic effects).

Ability to preserve ambiguity in the partition: this can be achieved, for instance, by means of a hierarchical clustering (which is ambiguous in the sense that a particular data object may belong to several clusters). Thus several possible clusters can be kept under consideration to be able to defer the decision making to the future. The inventors are not aware of a clustering algorithm that is capable of detecting local patterns without having to discover more global structure first, thus it seems that generally hierarchical approaches are better suited than partitional approaches.

It is acknowledged that there is no truly optimal choice of algorithm, but the OPTICS algorithm (Ankerst et al, "*OPTICS: Ordering points to identify the clustering structure*" Proc. ACM SIGMOD Int. Conf. on Management of Data, pages 49-60, 1999) is at least considered as a good candidate and has thus been used in the following discussion of the present invention.

Figure 1:
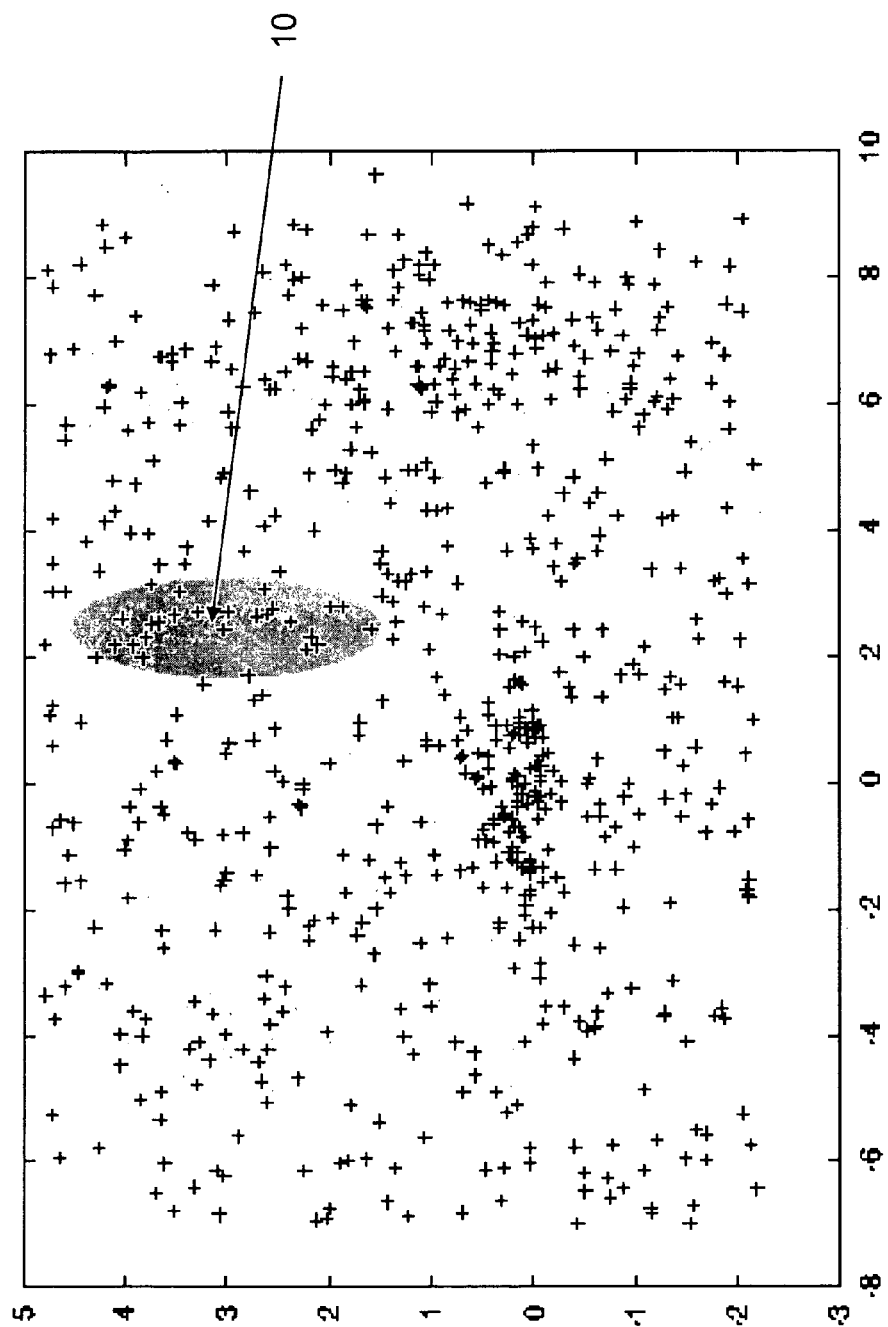
FIG. 1 shows a graphical depiction of a data set which may comprise one or more clusters.

Regarding flexibility, the notion of clusters is based on the concept of density-connected regions, that is, clusters are made up by data points close to each other with their individual data point density exceeding some threshold. The cluster's shape is therefore highly adaptable. Regarding robustness, the OPTICS algorithm requires only a single parameter (MinPts), which is somewhat related to k in k-nearest neighbour classifiers: by increasing MinPts, the stability of the results can be controlled. The threshold on the data density, which is used to actually define clusters (of a certain density) is not regarded as a parameter since all clusters can be obtained from the so-called reachability plot, which is the main result of the OPTICS algorithm. OPTICS uses additional thresholds to come up with the final partition of clusters, but we are not going to use this part of the algorithm. Finally, regarding stability, as long as the clusters are clearly separated and the noise level is low, the clusters exhibit themselves quite prominently in the reachability plot and OPTICS produces stable results However, stability becomes a problem if the noise level increases. It is important not to miss the small patterns even when in a noisy environment. FIG. 1 shows an artificial example consisting of about 500 uniformly distributed noise objects and about 200 data objects that belong to artificially superimposed clusters. It is not easy to determine how many clusters are present in the data set. It is difficult to tell whether some of the data agglomerations are small but substantial local patterns or just occurred by chance. Although generated from a uniform distribution, at this noise level the random noise points lump together into spurious clusters quite frequently, for example shaded region 10 in FIG. 1.

The data to be analysed is divided into slices Si of approximately the same size and the sequence of partitions obtained from some n consecutive slices is considered for clustering; each of the partitions is a set of data slices in which the data slices do not overlap with any of the other slices in the partition. It is not necessary to add time stamps to every data object, but all data in Si should have been observed before the data in any Sj, j>i. Thus, the size of the data slices should therefore be adjusted to the speed at which new data arrives. Whenever newly arrived data fills another data slice then another iteration of the analysis may be performed. By comparing the clusters of consecutive partitions it is possible to trace the clusters over time and thereby measure their stability. The outline of the approach is set out below in Table 1.

TABLE 1 t denotes the iteration (time), n the number of slices
we wish to analyse in one iteration. $S_t$ is the data slice
arrived at time interval #t.

| | |
|---|---|
| Set t = n | 1 |
| Run clustering algorithm with slices $S_{t-n+1} \cup S_{t-n+2} \cup ... \cup S_t$ | 2 |
| Extract clusters in $C_*^t$, denote the set of clusters by $P^t$ | 3 |
| While there is another data slice $S_{t+1}$ available { | 4 |
|   t=t+1 | 5 |
|   Run clustering algorithm with slices $S_{t-n+1} \cup S_{t-n+2} \cup ... \cup S_t$ | 6 |
|   Extract the clusters $C_*^t$, denote the set of clusters by $P^t$ | 7 |

TABLE 1-continued

| | |
|---|---|
| Match clusters in $P^t$ to those in $P^{t-1}$ | 8 |
| Account for the lifetime of the cluster in the cluster's history | 9 |
| Store partition of stable clusters | 10 |
| } | |

If the oldest data slice is removed and then replaced with a new data slice it will be understood that this will lead to considerable changes in the shape of the incidental data agglomerations seen in FIG. 1 but that there will be a lesser degree of change to the shape of true clusters. The main point of difference between small local clusters and incidental agglomerations formed by chance is therefore the stability of a cluster. Even if the random points spontaneously agglomerate, it is very unlikely that this will happen in the same way over multiple analyses. The longer an agglomeration—even if it is of low density—remains stable over time, the more likely it is that a true pattern has been observed in the data, i.e. that a cluster has been detected. However, the procedure described in Table 1 requires that the clusters are defined, although at the beginning of the analysis it is not possible to know how the agglomerations will evolve in the future. As has been discussed above, it is not possible to make definite statements regarding the partition, so some errors will result. This is the basis for the fourth requirement of the clustering algorithm (the ability to preserve ambiguity in the partition (see above)).

In a particular embodiment of the present invention, the cluster extraction procedure proposed by the authors of OPTICS is not used. Conventionally, the OPTICS algorithm determines at what distance E a data point p's neighbourhood will become dense (i.e. contains at least MinPts data objects) and at what distance a point ρ will belong to a cluster for the first time (called reachability distance, data near the border is not required to have MinPts data objects in the neighbourhood). Additionally, OPTICS finds an ordering of the data objects such that the reachability plot (which comprises data objects along the horizontal axis and reachability value on the vertical axis) has the property that consecutive data objects in the plot with reachability values below some given threshold belong to the same cluster for the given density level ϵ.

Figure 2B:
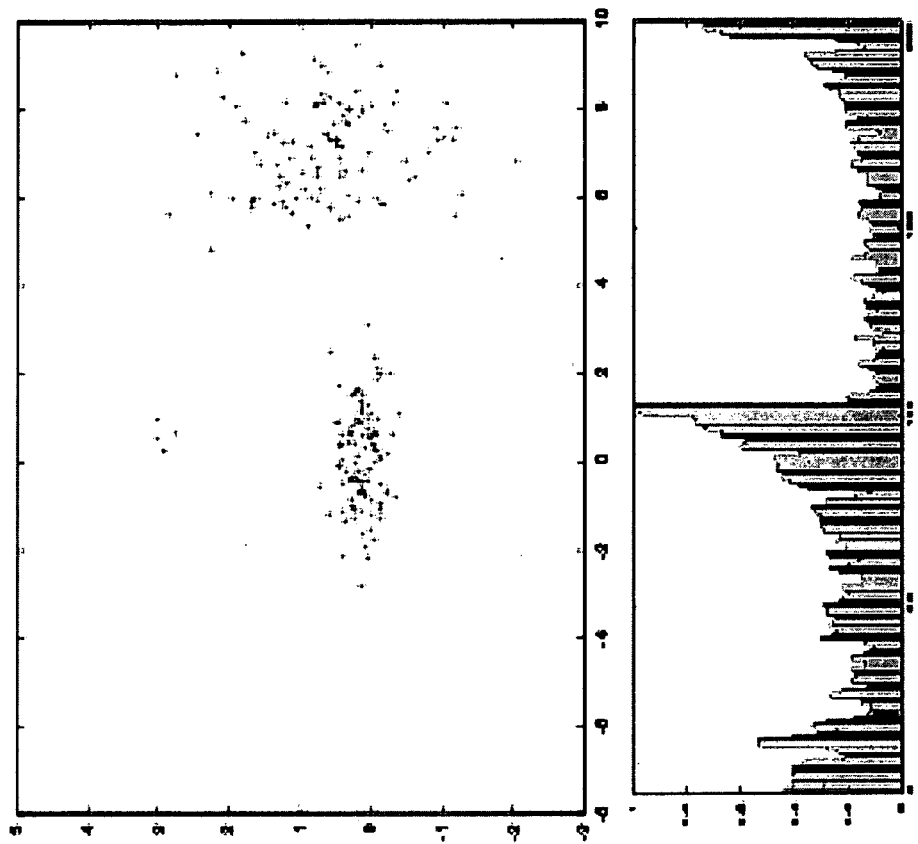
FIGS. 2a-2b show a graphical depiction of further data sets along with the related reachability plot.

Therefore, clusters are represented by valleys in the reachability plot and some user-specified thresholds on the steepness of the flanks of the valleys are used to decide whether a valley certifies as a deep valley and thus as a cluster (see FIG. 2b). OPTICS notion of an ϵ-cluster is that of data objects having at least MinPts data objects in their ϵ-neighbourhood, which somehow corresponds to having a minimum density for all objects in the cluster. It is therefore not surprising, that most illustrative examples of the OPTICS algorithm consist of clusters with constant data density. This is in contrast with many model-driven clustering algorithms, which usually assume a higher data density near the centre of the clusters. In practise, both types of clusters may occur. However, with noisy data and comparatively small clusters of non-uniform density, clusters do not show up that clearly in the reachability plot and fixing the requested threshold is difficult if at all possible (see FIG. 2a).

The present invention is based on a different approach that still uses the reachability plot, which is the outcome of the OPTICS algorithm, as its basis. If a straight line is drawn in the reachability plot, it is possible to mark thereby a certain data density level. Suppose a cluster is found at a certain density level, then in practise a subcluster with only a marginally increased density is not of interest. Instead, a subcluster is considered to be interesting only if its density is, for example, 2 times higher (or, in general, any other factor $f_d$ higher). A subcluster of a subcluster itself should again have at least a density $f_d$ times higher than that of its supercluster. This can be used as a rationale for setting up a cascade of density levels (given by $\rho_i = \rho_0 \times f_d^i$ with initial density $\rho_0$ and levels i=1 . . . L) and whenever the density of some subset of the data drops below such a density level then it may be considered as a cluster candidate. This procedure serves as a simple mechanism to prevent clusters that have only marginal differences in their density from being considered.

Given a data density $\rho_i$, how can this be matched to a vertical line in the reachability plot? Within a cluster, the reachability of a point p corresponds to the core distance of p, which is the smallest distance such that MinPts data objects can be found in a hypersphere of this radius around p. Given the volume V of the hypersphere $$V = \frac{\sqrt{\pi^d}}{\Gamma(d/2)} r^d \quad [1]$$

(where $\Gamma$ denotes the Gamma function) we may estimate the density at p by $$\rho = \text{Min}Pts/V \quad [2]$$

Using equation [2] we can transform our sequence of densities $(\rho_0, \rho_1, \rho_2, \ldots)$ into a sequence of hypersphere radii $(r_0, r_1, r_2, \ldots)$. For the case of the two-dimensional data, as in FIGS. 2a and 2b, we obtain $$r_i = \sqrt{\text{Min}Pts/(\rho_i \pi)} \quad [3]$$

Figure 2A:
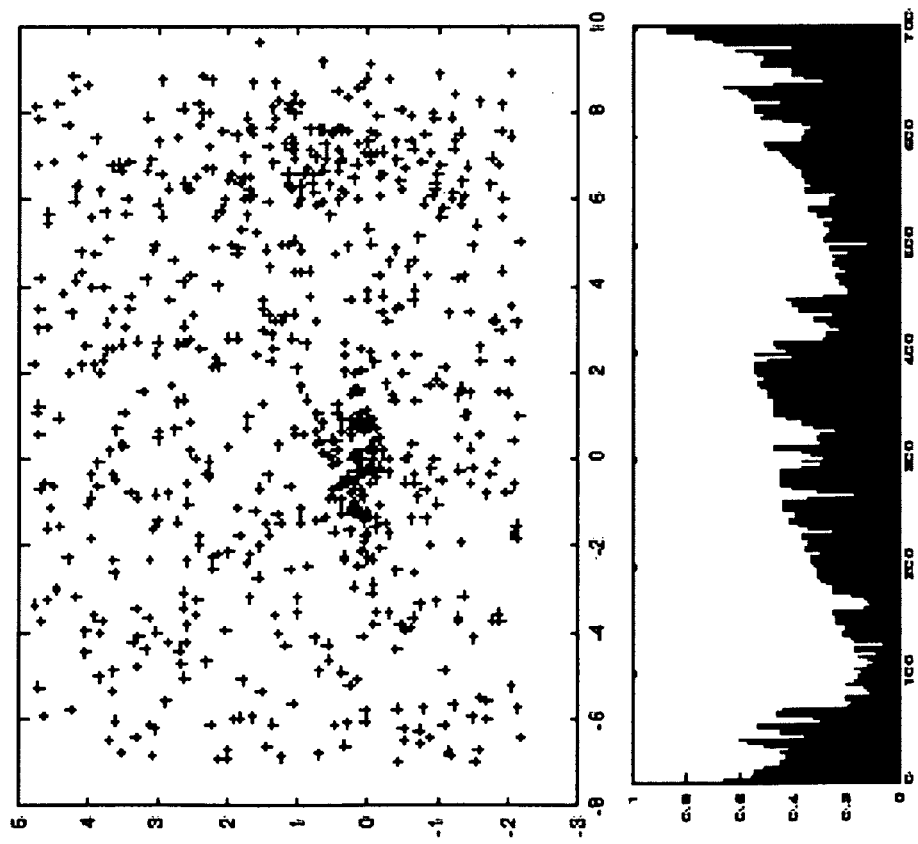
Figure 3:
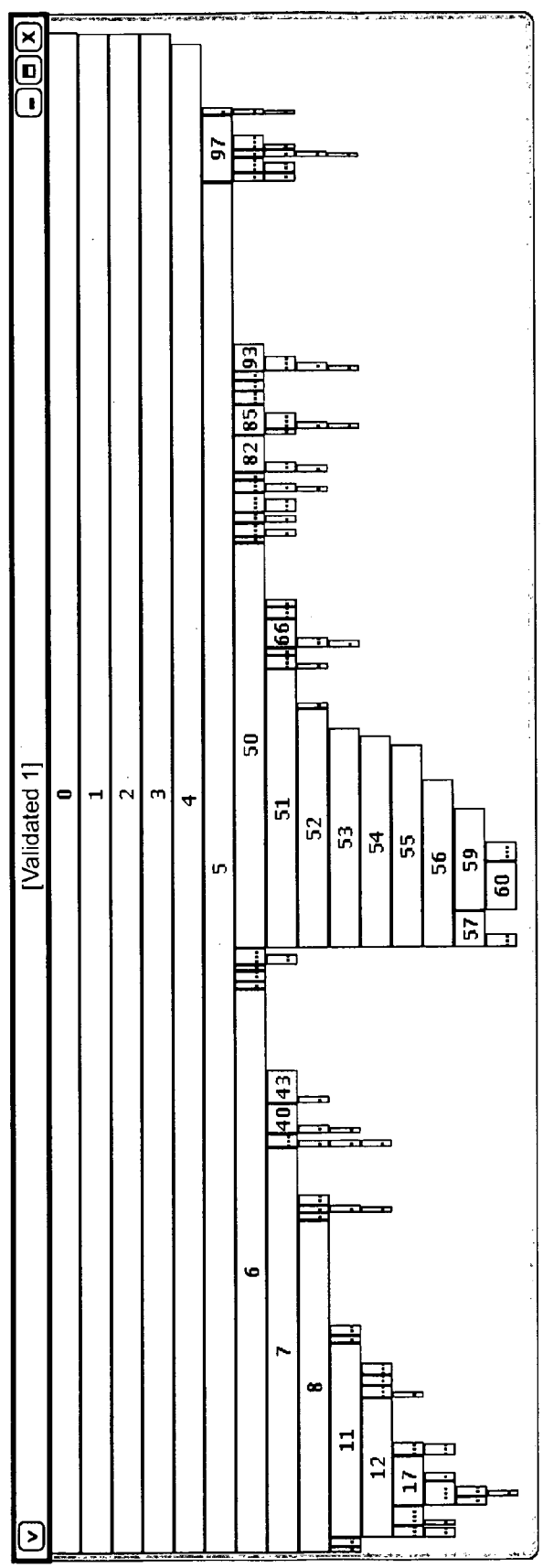
FIG. 3 shows a graphical representation of extracted cluster candidates.

Each of the $r_i$ can be plotted in the reachability plot of FIGS. 2a and 2b as a horizontal line at the respective reachability value. Whenever the reachability plot goes above such a line, the data belonging to this region has a density above the associated density threshold. To depict the cluster candidate we draw a rectangle in the graphical representation (see. FIG. 3) whenever this happens. A deep valley in the reachability plot will cross multiple lines and therefore indicate hierarchically nested rectangles in FIG. 3. We consider all these sets (that is rectangles) as cluster candidates, tolerating for the moment the fact that many of them may be incidental.

Figure 4:
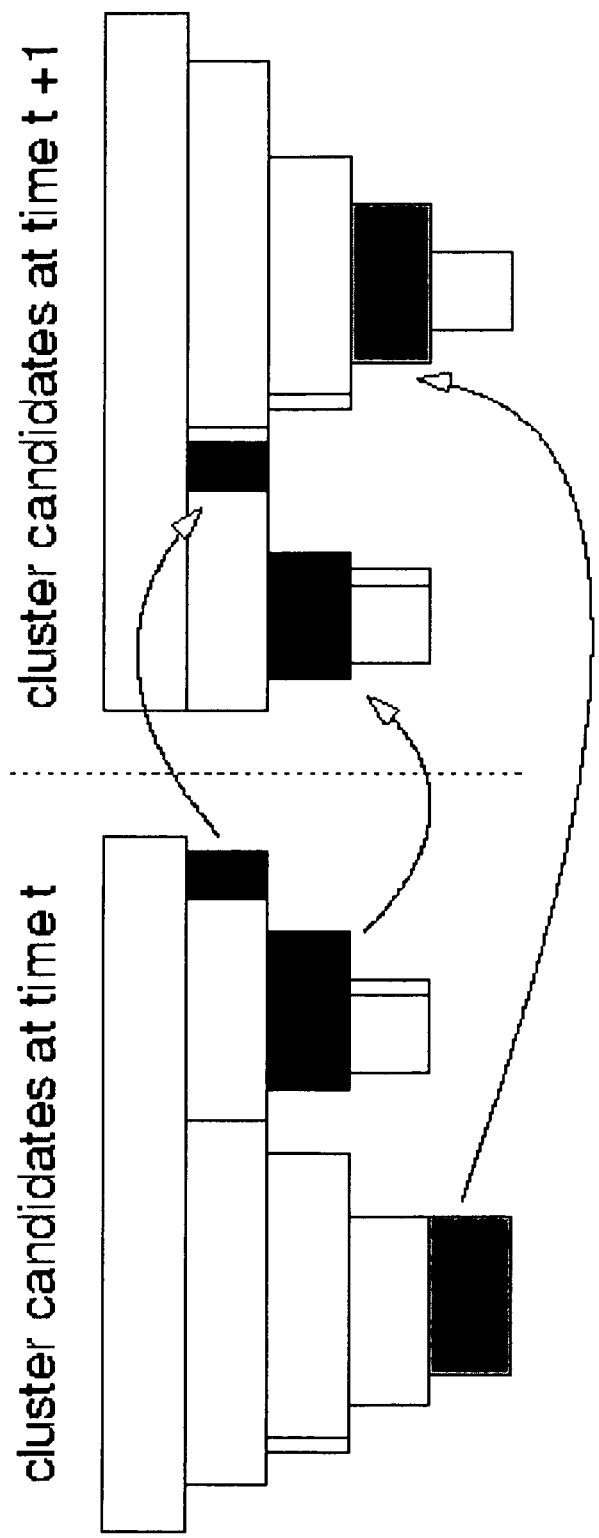
FIG. 4 shows a graphical representation of how rectangles can be matched in different cluster hierarchies.

Once two different hierarchies of clusters have been determined it is necessary to match the clusters against each other to see whether the cluster survives over time. That is, does a cluster that is detected at time t still exist at time t+1? FIG. 4 shows a graphical depiction of the matching of three cluster candidates from one point in time to a subsequent point in time. As the rationale for this matching, some measure is required that indicates for each pair of clusters (one cluster from the old partition and one from the new partition) whether it would be a good match or not. When both partitions were obtained from two completely different data sets (and the clusters cannot be represented by some model) there is no such measure, because there is no means to compare them against each other. Therefore clustering should be performed on more than one data slice per clustering, such that data from some slices are contained in both partitions.

Table 2 illustrates this: For every cluster analysis a data set is used that comprises n data slices. Then, between any two consecutive data sets, there is a common basis of n−1 data slices which can be used for matching. Given a cluster $C_i^{t-1}$ and $C_j^t$ from two consecutive data sets $D^{t-1}$ and $D^t$, the Jaccard measure:

$$J_{i,j} = \frac{C_i^{t-1} \cap C_j^t}{(C_i^{t-1} \cup C_j^t) \setminus (S_t \cup S_{t-n})} \quad [4]$$

can be adopted for the purpose of matching. The $J_{i,j}$ becomes 1 if both the old cluster and the new cluster contain the same data objects in the shared part of their dataset. Since the union in the usual Jaccard denominator (without subtracting $S_t \cup S_{t-n}$) would also contain some data objects, which cannot be in the intersection of both clusters since partition $P^{t-1}$ ($P^t$) was obtained without knowing the last slice $S_t$ (first slice $S_{t-n}$) of the slices $S_{t-n}, \ldots, S_t$, it is necessary to exclude this subset.

A $|P_{t-1}| \times |P_t|$ cost matrix is constructed, with M with $M_{i,j} = 1 - J_{i,j}$. To match the clusters pairwise, the bipartite graph matching algorithm disclosed by Munkres (also known as the Hungarian algorithm) is used (M. Munkres, "*Algorithms for the assignment and transportation problems*", Journal of the Society of Industrial and Applied Mathematics, 5(1):32-38, 1957). An assignment of two clusters is accepted only in the case that they share at least some percentage $\rho_m$ of the data, otherwise most of the data has obviously been scattered among other clusters and the original cluster does no longer exist. We have selected a relatively low value of $\rho_m = 30\%$ to account for changes in the cluster history, such as shrinking, expanding, etc.

aggregated in order to give a single stability value. If a cluster has been matched several times in a row, each time with a matching value of $m_t$, the stability of the cluster can be defined as:

$$S_t = \sum_{i=0}^{n} b_i \times m_{t-i} \quad [5]$$

$b_i$ is chosen such that $S_t$ becomes a weighted average. Since recent matches are more important than matches in the past, normalised coefficients can be used from a Gaussian function (for example, $b_i = \exp(-i^2/n^2)$ normalised to $$\sum_{i=1}^{n} b_i = 1),$$

but other weighting functions could also be used. The optimal value is 1.0 for a cluster that has been matched n times in the past with a Jaccard measure of 1.0. For a cluster to be stable at t, it is required that $S_t > 0.5$. Note that this measure does not explicitly account for the size or density of the cluster, and thus represents no bias towards large and dense clusters (which is important for the discovery of local patterns).

TABLE 2

| data set 1 | slice 1 | slice 2 | slice 3 | slice 4 | slice 5 | | |
|---|---|---|---|---|---|---|---|
| data set 2 | | slice 2 | slice 3 | slice 4 | slice 5 | slice 6 | |
| data set 3 | | | slice 3 | slice 4 | slice 5 | slice 6 | slice 7 |
| ... | | | | | | | |

Whenever a new data slice arrives, a new cluster analysis is performed, new clusters were extracted and then matched with the old ones. As mentioned above, initially a set of cluster candidates is extracted and then it is necessary to find the relevant clusters among them. Usually, the problem of cluster validity is based on some measures that account for the compactness or separation of clusters (or, in case of OPTICS, the steepness of the flanks). In the presence of high noise levels, these measures tend to break down.

Multiple data slices are available for analysis and the goal is to find stable clusters. There is little value in investigating clusters that are likely to vanish in the next period of time, that is, clusters that have a very short lifetime. The lifetime of a cluster may be quantified by counting the number of data sets over which a cluster survives. Whenever a cluster is successfully matched into the next hierarchy, its lifetime is increased by one. For example, a lifetime of 3 data sets may be required in order to consider that a cluster is substantial, as it is believed that it is unlikely that data agglomerates incidentally in the same way across three consecutive slices.

In a further embodiment of the present invention, a more sophisticated assessment of the stability of a cluster may be made. First of all, not all matched clusters are matched equally well. The Jaccard measure described above provides a precise measure of how much data is shared between the old and the new cluster. Rather than requiring three matches in a row, the matching values in the recent past may be directly For a first evaluation of the approach, the performance of the algorithm can be examined using an artificial test data set. A sequence of 11 data slices $S_t$, with t=0 ... 10, is examined. Every slice contains up to four (normally distributed) clusters: Cluster B and C are moving (at different speed) within the slices. Although both clusters move in approximately the same direction, the distance between the clusters is decreasing. Clusters A and D are static, that is they do not move at all. The size of the clusters is also varying: The moving clusters B and C are expanding and shrinking, respectively (by 5 data points per time step t). Cluster D will appear at t=7 for the first time and its initial size is 13; with every time step t its size will increase by 3 data points. Cluster A is a very small one, it consists of 3 data points per time slice only. The data regarding each of these four clusters is summarised below in Table 3:

TABLE 3

| | cluster parameters at time slice t | | | | |
|---|---|---|---|---|---|
| | mean | | std. dev. | | |
| cluster | x | y | $\sigma_x$ | $\sigma_y$ | size n |
| A | 0.7 | 2.8 | 0.18 | 0.18 | 3 |
| B | 7.0-0.5 t | 0.6 | 1.0 | 1.0 | 100 + 5 t |

TABLE 3-continued

| | cluster parameters at time slice t | | | | |
|---|---|---|---|---|---|
| | mean | | std. dev. | | |
| cluster | x | y | $\sigma_x$ | $\sigma_y$ | size n |
| C | −0.3 t | 0.6 | 1.0 | 0.2 | 100 − 5 t |
| D | −3.0 | −1.0 | 0.3 | 0.3 | min(0, 10 + 3(t − 6)) |

At the final slice (t=10) the clusters consist of about 250 data points. In the first example, another 50 noise data points are added to each data slice (giving a 17% noise level). In the second example, 500 uniformly distributed data points were added such that there is twice as much noise as substantial data. FIG. 2b shows the first data slice with a low noise level and FIG. 2a shows the data slice with 500 noise points. In particular, cluster A, which consists of 3 data points per slice only, is almost impossible to detect in FIG. 2a.

FIGS. 5a-5e and 6a-6e, respectively, show the result of the algorithm for the case of 50 and 500 noise points, respectively. In both cases, the same parameter setting has been used: MinPts=3, the number of slices (n)=5, density factor $f_d$=1.3. Using five time slices for each OPTICS run, the algorithm reaches the last time slice (t=10) after 6 iterations but only the last 5 iterations are shown in FIGS. 5a to 5e and FIGS. 6a to 6e respectively.

At the beginning, the clusters are observed for the first time and none of them can be considered to be stable. The first stable clusters are discovered in the third iteration (i.e. FIGS. 5c & 6c). In FIGS. 5a-5e and 6a-6e stable clusters are shaded; the darker the shading of the rectangle indicates the greater stability of the cluster. Note that the horizontal ordering of the clusters needs not to be the same in consecutive hierarchies, therefore numbers indicating the cluster ID are shown in every rectangle (for example, see the horizontal location of cluster #31 in FIGS. 5c & 5d).

Figure 5A:
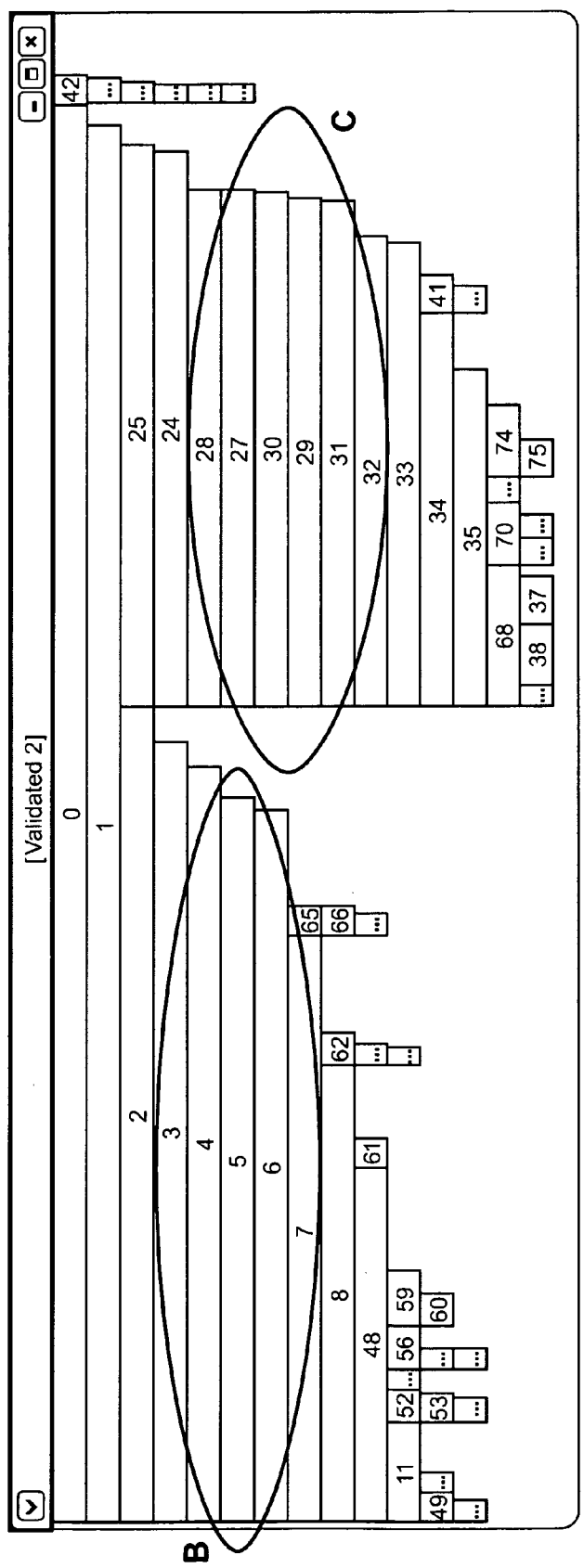
FIGS. 5a-5e show a graphical depiction of the experimental results in a low noise environment.
Figure 5B:
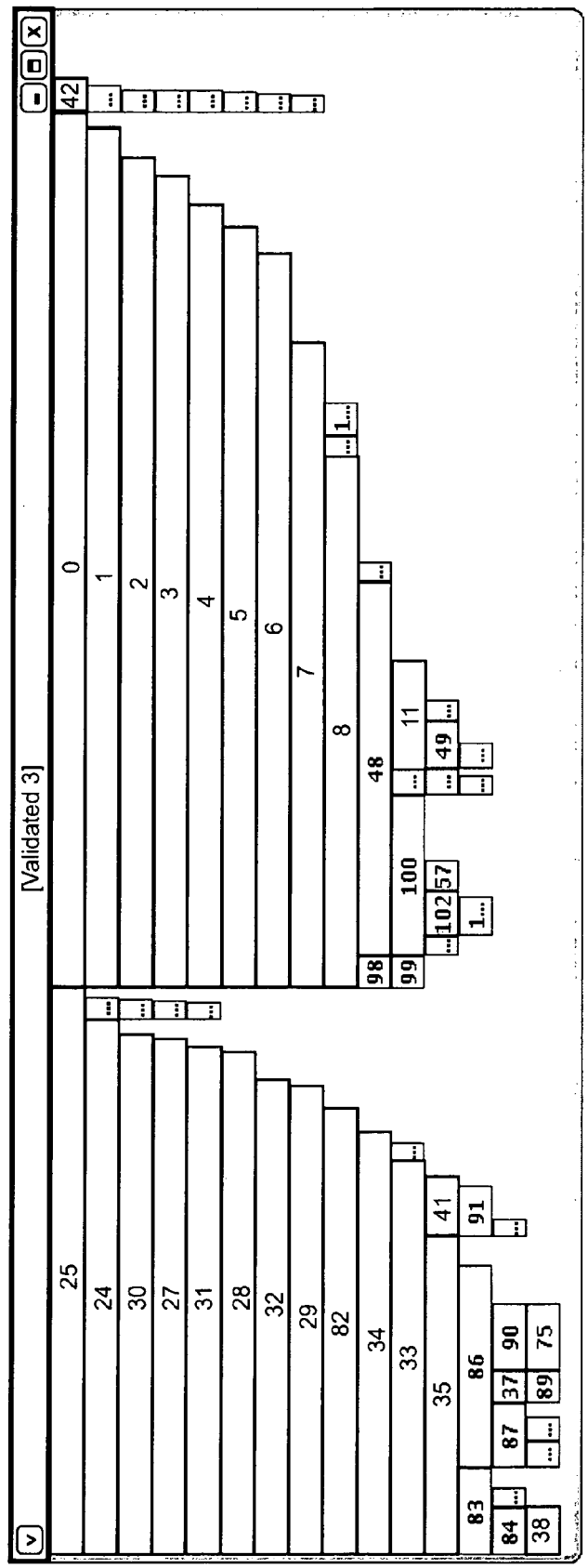

Referring to FIG. 5a, it can be seen that the large clusters B and C show up very clearly from the beginning by a cascade of vertically stacked rectangles. The width of these rectangles indicates their size and the number of levels of rectangles indicates their density. In the top hierarchy we can see that the left cascade is not that deep as the right, so its data density is lower (cluster #4-#7 correspond to original cluster B, cluster #27-#32 correspond to original cluster C). Tracking, for instance, rectangles #4 and #32 it is observed that their width (cluster size) is increasing and decreasing, respectively. We can also observe that in FIGS. 5c and 5d that there are an increased number of data levels (top rectangles) that span across both clusters B and C. That is, the data density at which we may consider both clusters as a single cluster is increasing. This is due to the fact that the distance between both clusters is decreasing (i.e. that the clusters are merging).

Figure 5C:
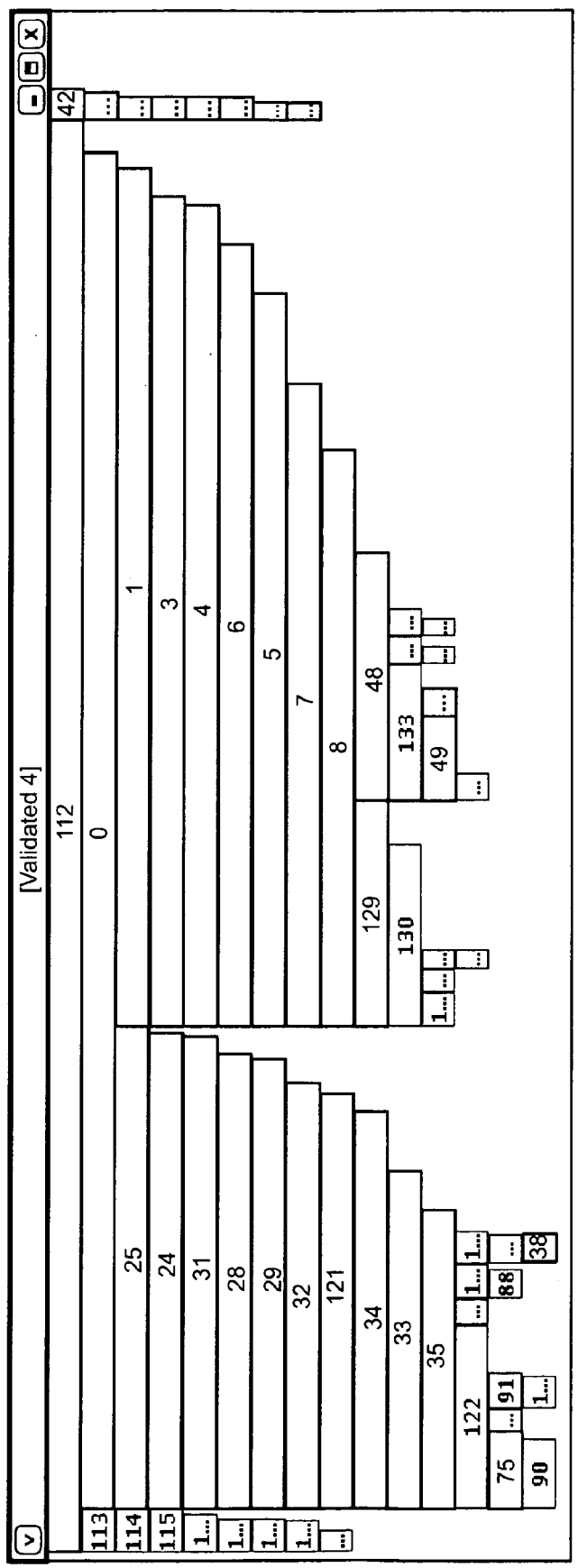
Figure 5D:
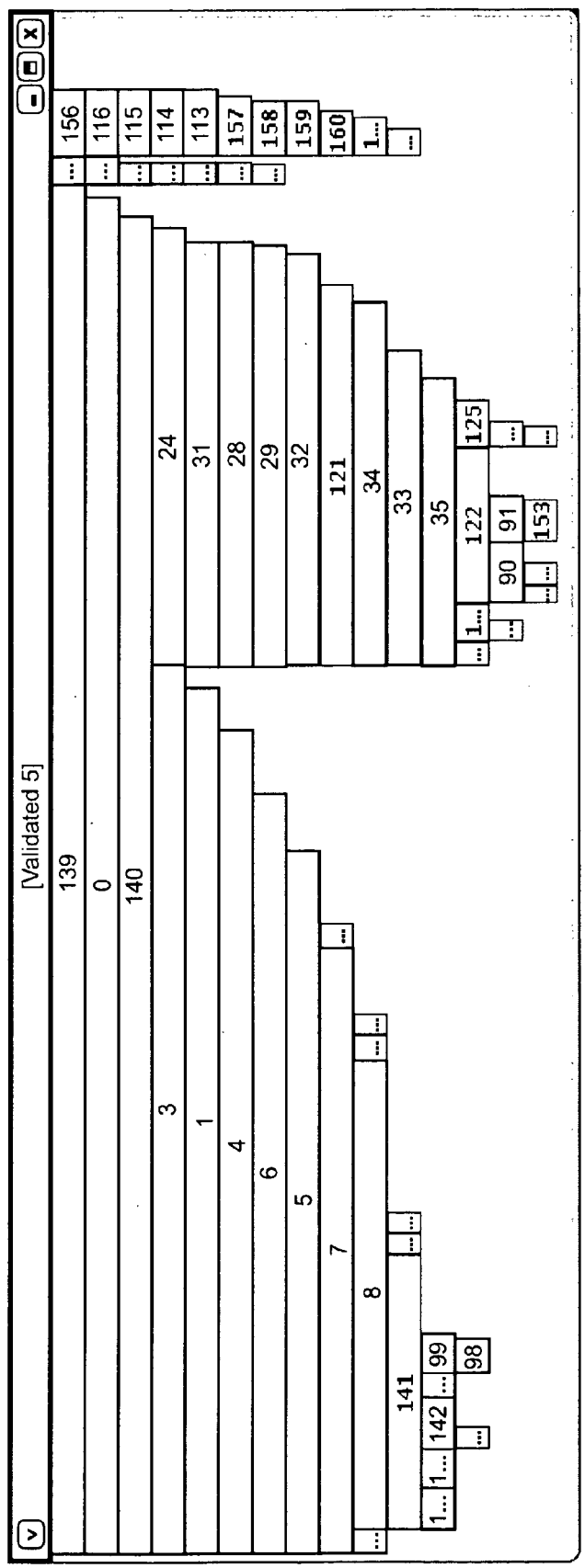
Figure 5E:
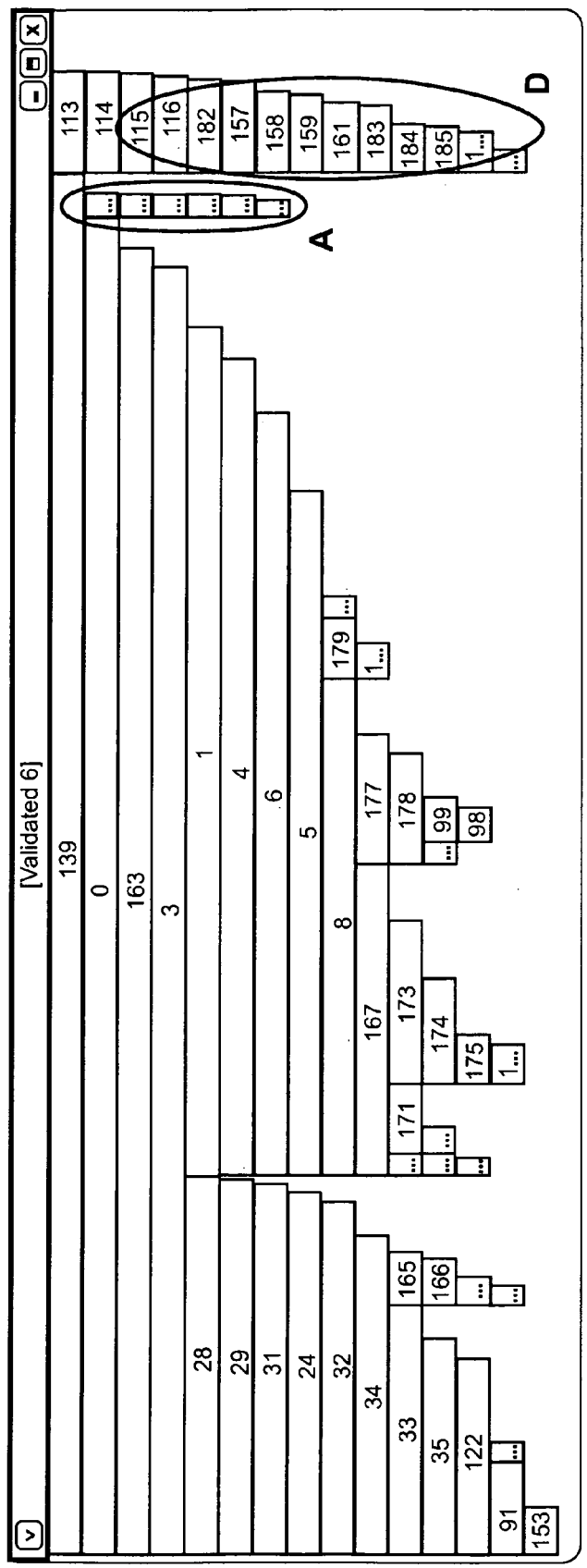
Figure 6A:
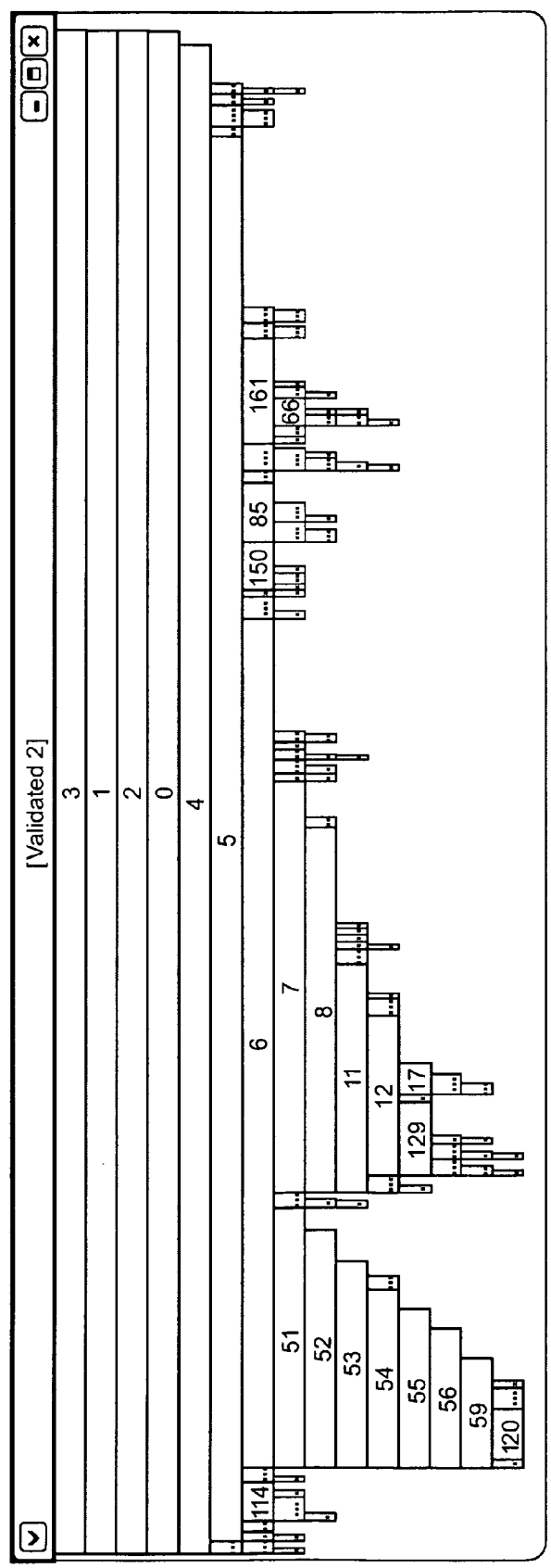
FIGS. 6a-6e show a graphical depiction of the experimental results in a high noise environment.
Figure 6B:
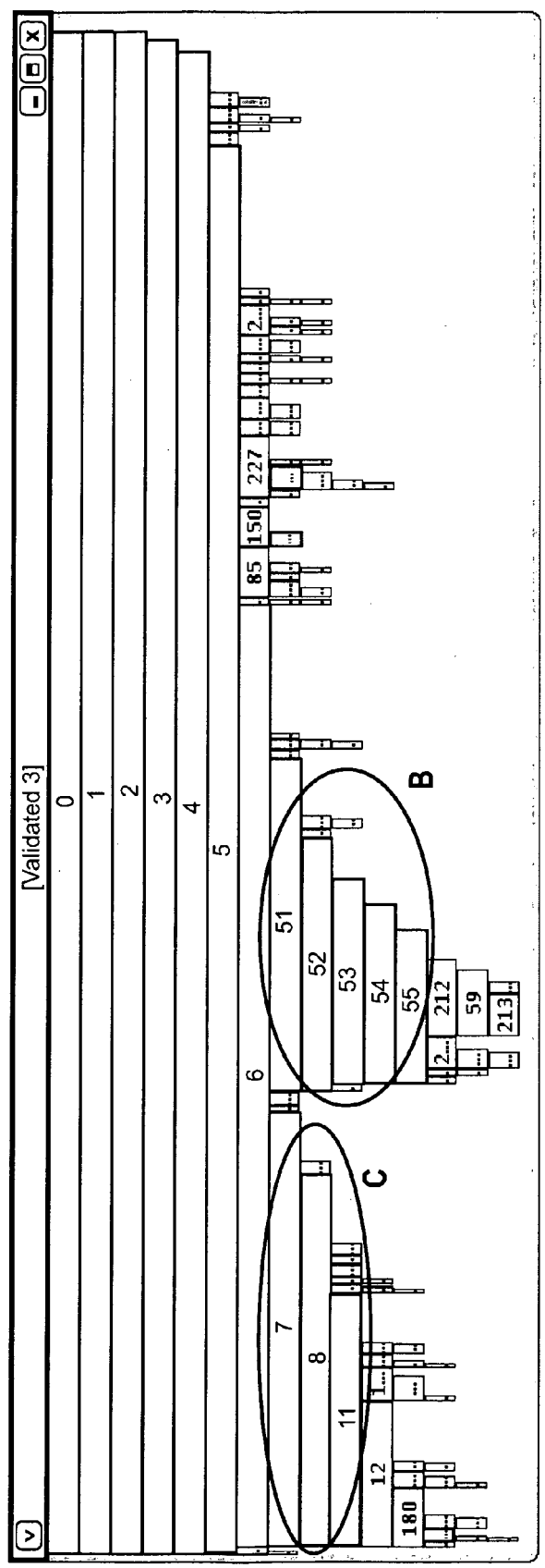
Figure 6C:
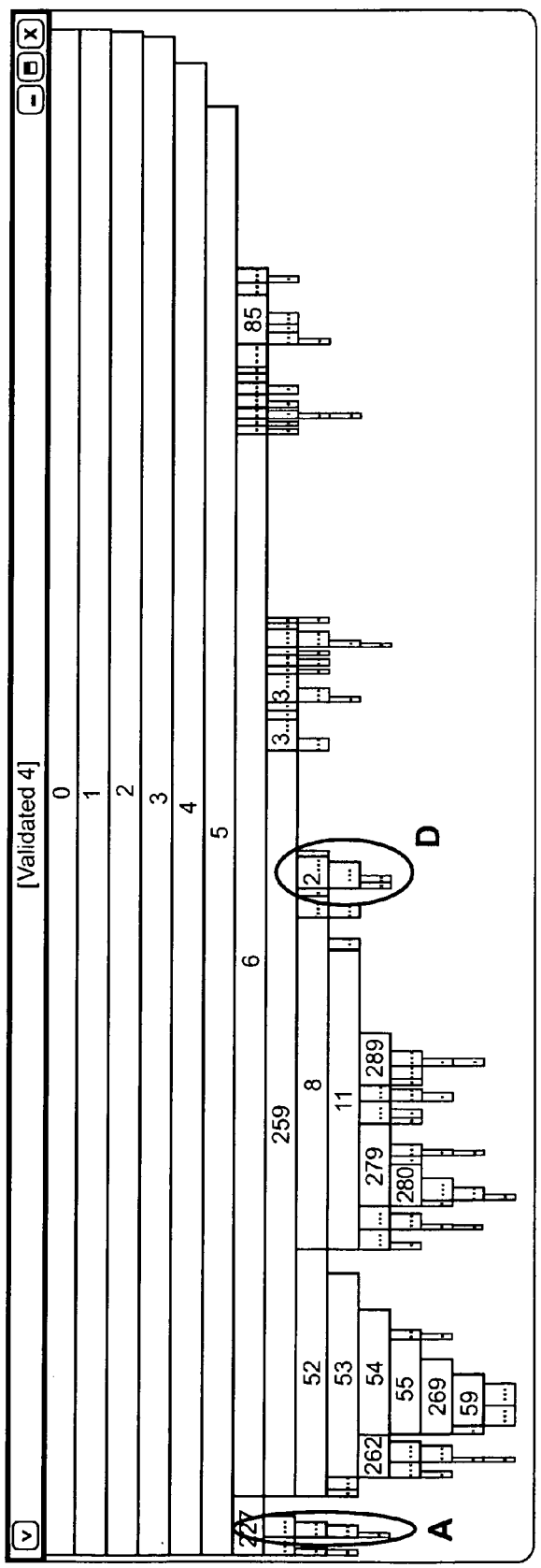
Figure 6D:
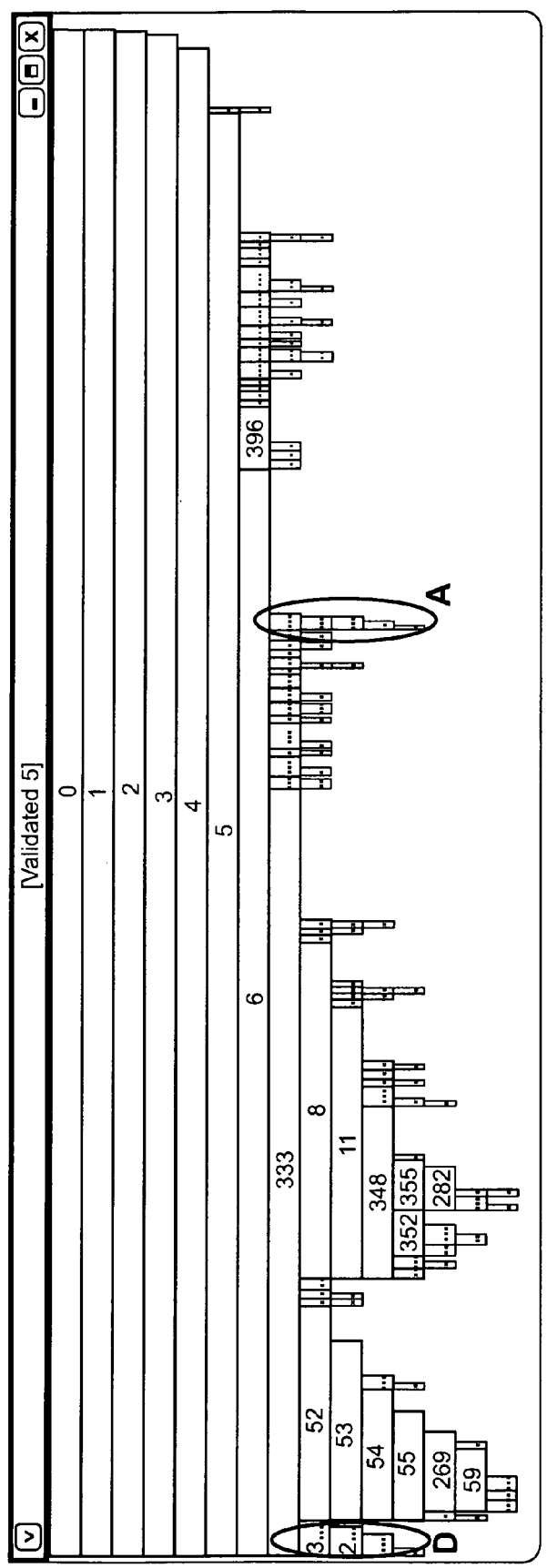
Figure 6E:
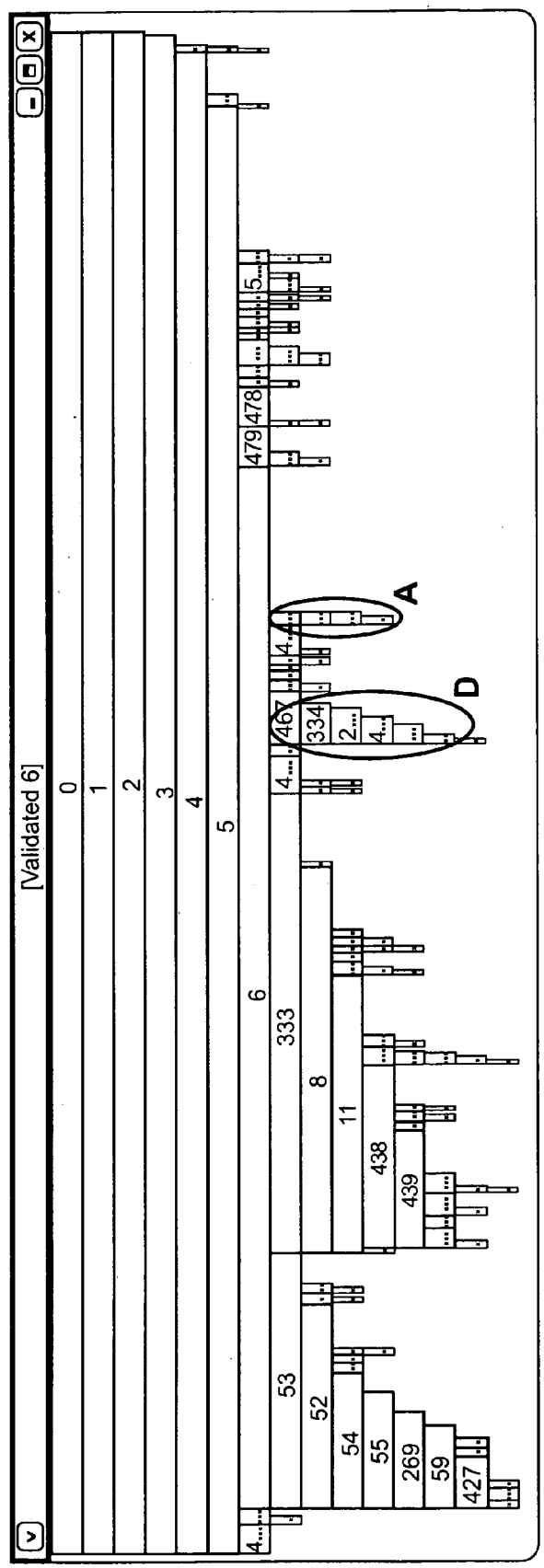

The upcoming cluster D can be observed on the left of FIG. 5c for the first time (#113). It gets more and more pronounced with every new iteration. In FIG. 5e it can be seen that the cluster is already quite stable at the lower density levels (but not on the higher levels). The rectangles at the bottom end of the nested rectangles are, however, not stable (which is also true for the other clusters). This is caused by fluctuation and incidental patterns rather than substantial clusters and should not be presented to an end-user.

The small cluster A also shows up very clearly (because we have not much noise in this example) and becomes stable in FIG. 5c (second hierarchy, rectangle #42). The dark shaded rectangles of the final hierarchy show that we have found (despite of its small size and low density) a very stable cluster.

The more interesting example is the second one with 67% noise, shown in FIGS. 6a, 6b, 6c, 6d and 6e. Compared to FIGS. 5a, 5b, 5c, 5d and 5e two observations can be made:

(1) due to the high noise level, the whole data set is density-connected for the first 5-6 data density levels; and (2) there are many more small clusters (small rectangles), which is due to spontaneous data agglomerations in the noise. Most of these agglomerations vary from time slice to time slice that much, that they do not become stable. By FIG. 6e only a very small number if these small rectangles are stable with the rectangles belonging to cluster A being most stable. The clusters B and C can be observed in a similar manner as is described above with reference to FIGS. 5a, 5b, 5c, 5d and 5e. Cluster D is more difficult to detect now, because it has to compete against all the noise around it. Nevertheless, in FIG. 6e it can be recognised as a stable cluster.

Figure 7:
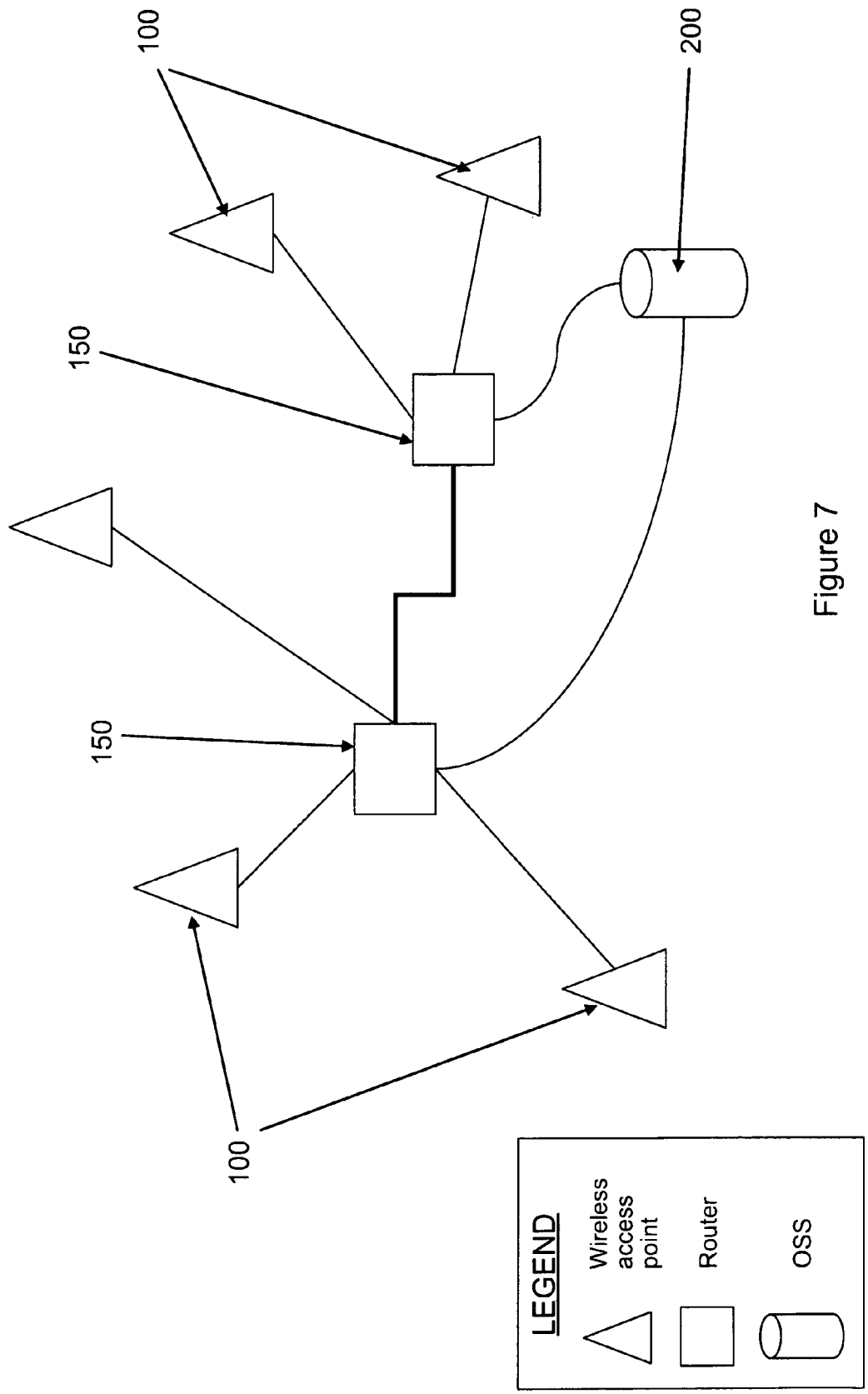
FIG. 7 shows a schematic depiction of a communication network in which a method according to the present invention is used as a part of an intrusion detection system.

FIG. 7 shows a schematic depiction of a communication network in which the present invention is used as a part of an intrusion detection system. FIG. 7 shows a plurality of wireless network access points 100, each of which is connected to a network router 150. The network routers are in turn connected to other network routers and are also connected to other communications networks and/or network gateways (not shown). A first user that is wirelessly connected to one of the access points 100 may communicate with a second user that is connected to a wireless access point, with the communication being routed via one or more network routers (if necessary).

The network routers are also connected to an operational support system (OSS) 200 which, in part, implements the method of the current invention. Each of the wireless access points 100 will report data relating to the operation and performance of the respective access point to the OSS, the data being routed via network routers 150. This data is analysed and used to configure and manage the network. The access points may report unsuccessful attempts to gain access to the network. Some of these unsuccessful attempts may be legitimate (for example being caused by incorrectly entered passwords, inadvertent attempts to log in to a network that a user has no permission to use, etc.) but if there is a concerted attempt to gain access to the network then this data is likely to form clusters amongst the legitimate failed attempts, which should be randomly distributed.

Every statistic gathered at the same point in time by the OSS forms a record which is basically a snapshot of the network state. Using the conventional nomenclature for data analysis tasks each statistic will be referred to an attribute and the value of a statistic as its attribute value. The set of different values a statistic can have is called an attribute's range.

The data relating to failed access attempts and their time stamps are transferred to the OSS for further processing. The OSS comprises, in part, a conventional computer that executes a computer program in order to perform a method according to the present invention. As is conventional, the computer comprises data storage means for storing OSS applications & data, an operating system and other programs and data required for the operation of the computer. The various applications and data are loaded into memory for execution by a CPU. One or more communications interfaces are provided to receive data from the network routers (and/or other network elements) and to transmit data to other systems and/or programs. Other apparatus are provided such that the performance of the OSS and the network can be monitored and commands entered into the system.

In order to input the records attributes which are nominal, like the name of a device, have to be transformed into a numeric representation. This can be down by encoding every possible value of the attribute, like each name of a device, into its own attribute with the numeric domain {0,1}. The attribute takes on the value 1 if the device has the specific name, otherwise 0 (this transformation is well known to someone skilled in the art of data analysis). A method according to the present invention can then be used to analyse the received data and to discover clusters.

Figure 8:
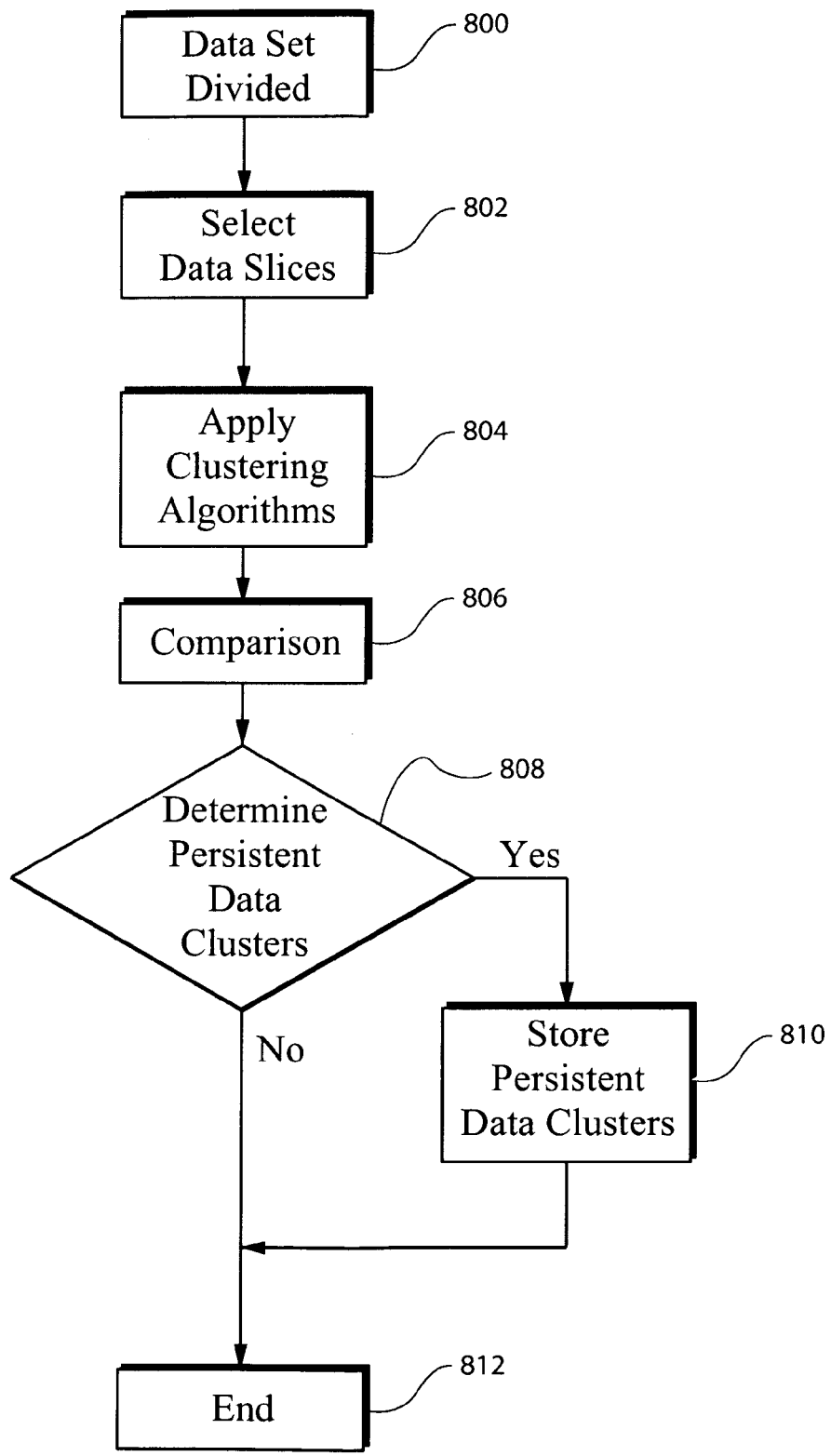
FIG. 8 shows a flow diagram of the method of the present invention.

FIG. 8 shows a flow chart of the method of the present invention. In step 800, the data set is divided into a plurality of data slices. In step 802, a plurality of data slice groups are selected from the plurality of data slices. In step 804, a data clustering algorithm is applied to each of the data slice groups selected in step 802. The results of the data clustering algorithm for each of the selected data slice groups are compared with the results of the subsequent data slice group in step 806. In step 808 it is then determined if there are one or more persistent data clusters. If there are persistent data clusters they are stored in step 810 and then the process ends at step 812. If no persistent data clusters are determined in step 808 the process ends at step 812. As will be understood by those skilled in the art, the determination of whether there are one or more persistent data clusters can be carried out in a number of ways. For example, step 808 can determine a persistent data cluster if it is present in more than one subsequent data slice group, if it is present in at least 3 subsequent data slice groups, or if its cluster parameter exceeds a given threshold.

Because the focus is on evolving patterns of abnormal usage the primary interest is normally on very small clusters. For this reason, once a cluster has been identified it can be compared to a threshold to check whether it fulfils certain requirements on its size. The requirements itself are application dependent, but can be easily determined and configured by a skilled person, like a network designer or administrator. If a cluster is small enough it is either reported for further action to be taken or send to another system which automatically reconfigures the network. It should be remembered that a discovered cluster is essentially a footprint of a certain activity based on network statistics. It is therefore quite simple to use the obtained information as a filter to flag future activities or to use it as the key for a knowledge base to determine required and automatically carry out required actions.

It will be understood that the present invention can be used to detect clusters in data sets that represent other functions or operations and that the present invention can be used where it is necessary to detect patterns or clusters in varying data sets.

We claim:

1. A method of evaluating one or more clusters in a data set, the method comprising:
   using at least one computer having a processor coupled to a program memory containing a computer program configured to:
   a) divide said data set into a plurality of data slices;
   b) select a plurality of data slice groups from said plurality of data slices;
   c) apply a data clustering algorithm to each of said data slice groups;
   d) for each of said data slice groups, compare the results of the data clustering algorithm with the results obtained from a subsequent data slice group to determine one or more persistent data clusters; and
   e) store in a memory device said one or more persistent data clusters determined in d).

2. A method according to claim 1, wherein in d) a data cluster is defined as a persistent data cluster if it is present in a plurality of subsequent data slice groups.

3. A method according to claim 2, wherein in d) a data cluster is defined as a persistent data cluster if it is present in at least 3 subsequent data slice groups.

4. A method according to claim 1, wherein in d) a data cluster is defined as a persistent data cluster if its cluster persistence parameter exceeds a given threshold.

5. A method according to claim 4, wherein the cluster persistence parameter comprises a weighted average of a number of values.

6. A method according to claim 4, wherein said cluster persistence parameter represents the proportion of cluster data present in a cluster in one data slice group and in a subsequent data slice group.

7. A method according to claim 6, wherein the cluster persistence parameter comprises a weighted average of a number of values.

8. A non-transitory computer readable medium tangibly storing computer executable code which when loaded onto a computer will execute the method of claim 1.

* * * * *